(12) United States Patent
Umemoto

(10) Patent No.: US 10,766,993 B2
(45) Date of Patent: Sep. 8, 2020

(54) ABA BLOCK COPOLYMER, DISPERSANT, AND PIGMENT DISPERSION COMPOSITION

(71) Applicant: OTSUKA CHEMICAL CO., LTD., Osaka-shi, Osaka (JP)

(72) Inventor: Hikaru Umemoto, Tokushima (JP)

(73) Assignee: OTSUKA CHEMICAL CO., LTD., Osaka-shi, Osaka (JP)

( * ) Notice: Subject to any disclaimer, the term of this patent is extended or adjusted under 35 U.S.C. 154(b) by 40 days.

(21) Appl. No.: 16/068,198

(22) PCT Filed: Jan. 13, 2017

(86) PCT No.: PCT/JP2017/000985
§ 371 (c)(1),
(2) Date: Jul. 5, 2018

(87) PCT Pub. No.: WO2017/135011
PCT Pub. Date: Aug. 10, 2017

(65) Prior Publication Data
US 2019/0002620 A1    Jan. 3, 2019

(30) Foreign Application Priority Data

Feb. 3, 2016    (JP) ................. 2016-018618
Jun. 8, 2016    (JP) ................. 2016-114339

(51) Int. Cl.
| | | |
|---|---|---|
| C09D 11/033 | (2014.01) | |
| C08F 293/00 | (2006.01) | |
| C09D 11/326 | (2014.01) | |
| B41M 5/00 | (2006.01) | |
| C09D 11/037 | (2014.01) | |
| C09D 11/107 | (2014.01) | |
| C09D 11/322 | (2014.01) | |

(52) U.S. Cl.
CPC .......... *C08F 293/005* (2013.01); *B41M 5/00* (2013.01); *B41M 5/0023* (2013.01); *C08F 293/00* (2013.01); *C09D 11/033* (2013.01); *C09D 11/037* (2013.01); *C09D 11/107* (2013.01); *C09D 11/322* (2013.01); *C09D 11/326* (2013.01); *C08F 2438/00* (2013.01)

(58) Field of Classification Search
CPC . C08F 293/005; C09D 11/033; C09D 11/037; C09D 11/107; C09D 11/322; C09D 11/326; B41M 5/00; B41M 5/0023
USPC ........................................................ 523/160
See application file for complete search history.

(56) References Cited

U.S. PATENT DOCUMENTS

| | | |
|---|---|---|
| 5,721,321 A | 2/1998 | Fock et al. |
| 9,260,557 B2* | 2/2016 | Umemoto .............. C09D 17/00 |
| 10,189,936 B2* | 1/2019 | Masumoto .......... C09D 153/00 |
| 2006/0167199 A1 | 7/2006 | Yamago et al. |
| 2008/0009597 A1 | 1/2008 | Yamago et al. |
| 2010/0143590 A1 | 6/2010 | Held et al. |
| 2011/0223529 A1 | 9/2011 | Shimanaka et al. |
| 2013/0196064 A1 | 8/2013 | Shimanaka et al. |
| 2014/0363642 A1 | 12/2014 | Kawaguchi et al. |
| 2016/0160068 A1 | 6/2016 | Kawaguchi et al. |
| 2018/0002473 A1 | 1/2018 | Masumoto |

FOREIGN PATENT DOCUMENTS

| | | |
|---|---|---|
| EP | 2330154 A1 | 6/2011 |
| EP | 2423271 A1 | 2/2012 |
| EP | 2816088 A1 | 12/2014 |
| JP | 2011-225834 A | 11/2011 |
| JP | 2012-36251 A | 2/2012 |
| WO | 2004/014962 A1 | 2/2004 |
| WO | 2010/013651 A1 | 2/2010 |
| WO | 2013/115071 A1 | 8/2013 |
| WO | 2016/132863 A1 | 8/2016 |

OTHER PUBLICATIONS

International Search Report dated Apr. 11, 2017, issued in counterpart International Application No. PCT/JP2017/000985 (2 pages).
Chinese Office Action dated Dec. 31, 2019, issued in counterpart Chinese Patent Application No. 201780009757.9. (5 pages).
Extended European Search Report dated Sep. 12, 2019, issued in Application No. 17747173.7 (PCT/JP2017000985).

* cited by examiner

*Primary Examiner* — Hannah J Pak
(74) *Attorney, Agent, or Firm* — Westerman, Hattori, Daniels & Adrian, LLP

(57) ABSTRACT

Provided is an ABA block copolymer that can offer a pigment dispersion composition having excellent dispersion stability when used as a pigment dispersant in an aqueous medium. An ABA block copolymer including: an A block containing a structural unit represented by a general formula (1) below and a structural unit derived from a vinyl monomer with an acid group; and a B block containing a structural unit derived from a vinyl monomer with an aromatic ring group or an alicyclic alkyl group, the ABA block copolymer having an acid value of 30 to 250 mgKOH/g.

[Chem. 1]

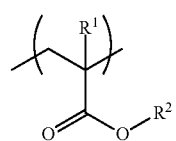

(1)

In the general formula (1), $R^1$ is a hydrogen atom or a methyl group and $R^2$ is an alkyl group having 2 to 10 carbon atoms.

8 Claims, No Drawings

ABA BLOCK COPOLYMER, DISPERSANT, AND PIGMENT DISPERSION COMPOSITION

TECHNICAL FIELD

The present invention relates to ABA block copolymers, dispersants, and pigment dispersion compositions.

BACKGROUND ART

Water-based inks are being widely used as inks for printers and the like in consideration of the environment and include: dye inks in which a dye serving as a colorant is dissolved in an aqueous medium; and pigment inks in which a pigment serving as a colorant is finely dispersed in an aqueous medium. Dye inks have problems of light resistance and water resistance and, therefore, pigment inks are advantageously used in applications requiring light resistance and water resistance. However, in the case of using a pigment as a colorant, a failure of dispersion of the pigment occurs unless pigment particles are dispersed as fine particles in a medium and stabilized in that state. If the pigment with a dispersion failure is used as an ink, the failure emerges as lacks of ink characteristics, such as a decrease in coloring power, clogging of pores or deterioration in storage stability due to increased viscosity. Therefore, the pigment is required to have dispersion stability.

Meanwhile, because of high fastness of prints using pigment inks, there is a growing demand for pigment inks in the field of photographic printing requiring high print density (color developability). Therefore, printing on a recording medium having low pigment ink permeability, such as glossy paper, is being required. However, because in this case the pigment does not penetrate into but stays on the surface of the recording medium, there arises a problem, for example, in that when an image-formed portion is in friction with something, the pigment is peeled off from the surface, so that the image is diluted or erased. This phenomenon is referred to as a fixation failure. As a solution to improve fixability, there is known a technique for adding, in addition to a pigment dispersant, a water-soluble resin or a resin emulsion to the ink. However, in terms of the composition design of ink, there is a need for a pigment dispersant having both pigment fixation stability and pigment dispersion stability.

Patent Literatures 1 and 2 propose to use, as a pigment dispersant made of a block copolymer, an A-B diblock copolymer made of a hydrophilic A block and a hydrophobic B block. Patent Literature 3 proposes to use an A-B diblock copolymer made of a hydrophilic A block and a hydrophobic B block or an A-B-C triblock copolymer made of hydrophilic A and C blocks and a hydrophobic B block.

CITATION LIST

Patent Literature

Patent Literature 1: JP-A-2011-225834
Patent Literature 2: JP-A-2012-36251
Patent Literature 3: WO 2010/013651

SUMMARY OF INVENTION

Technical Problem

However, Patent Literatures 1 and 2 do not refer to the print density and fixability on a low-permeable recording medium. Patent Literature 3 does not give sufficient consideration to the triblock copolymer and does not specifically disclose the print density and fixability on a low-permeable recording medium.

The present invention has an object of providing: an ABA block copolymer that can offer a pigment dispersion composition having excellent dispersion stability when used as a pigment dispersant in an aqueous medium; a dispersant containing the ABA block copolymer; and a pigment dispersion composition that can give high print density and fixability when printed on a low-permeable recording medium or the like.

Solution to Problem

The present invention provides the following ABA block copolymer, dispersant, and pigment dispersion composition.

Aspect 1:
An ABA block copolymer including: an A block containing a structural unit represented by a general formula (1) below and a structural unit derived from a vinyl monomer with an acid group; and a B block containing a structural unit derived from a vinyl monomer with an aromatic ring group or an alicyclic alkyl group, the ABA block copolymer having an acid value of 30 to 250 mgKOH/g.

[Chem. 1]

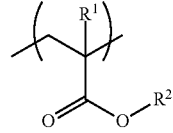

(1)

In the general formula (1), $R^1$ is a hydrogen atom or a methyl group and $R^2$ is an alkyl group having 2 to 10 carbon atoms.

Aspect 2:
The ABA block copolymer according to Aspect 1, wherein the structural unit represented by the general formula (1) is at a content of 20 to 80% by mass in 100% by mass of the A block.

Aspect 3:
The ABA block copolymer according to Aspect 1 or 2, wherein the acid group is at least one selected from among a carboxyl group, a sulfonic acid group, and a phosphoric acid group.

Aspect 4:
The ABA block copolymer according to any one of Aspects 1 to 3, wherein a content of the B block is 20 to 80% by mass in 100% by mass of the entire ABA block copolymer.

Aspect 5:
The ABA block copolymer according to any one of Aspects 1 to 4, having a polydispersity index (PDI) of less than 2.0.

Aspect 6:
The ABA block copolymer according to any one of Aspects 1 to 5, being formed by living radical polymerization.

Aspect 7:
A dispersant containing the ABA block copolymer according to any one of Aspects 1 to 6 and/or a neutralized product of the ABA block copolymer according to any one of Aspects 1 to 6.

Aspect 8:

A pigment dispersion composition containing the dispersant according to Aspect 7, a pigment, and an aqueous dispersion medium.

Aspect 9:

The pigment dispersion composition according to Aspect 8, being an ink-jet ink.

Advantageous Effects of Invention

The ABA block copolymer and dispersant according to the present invention can offer a pigment dispersion composition having excellent dispersion stability when used as a pigment dispersant in an aqueous medium.

The pigment dispersion composition according to the present invention can give high print density and fixability when printed on a low-permeable recording medium or the like.

DESCRIPTION OF EMBODIMENTS

Hereinafter, a description will be given of an example of a preferred embodiment for working of the present invention. However, the following embodiment is simply illustrative. The present invention is not at all limited by the following embodiment.

<ABA Block Copolymer>

An ABA block copolymer according to the present invention is a copolymer formed by polymerization using two or more types of vinyl monomers. Specifically, the above ABA block copolymer is an ABA block copolymer including: an A block containing a structural unit represented by a general formula (1) below and a structural unit derived from a vinyl monomer with an acid group; and a B block containing a structural unit derived from a vinyl monomer with an aromatic ring group or an alicyclic alkyl group, the ABA block copolymer having an acid value of 30 to 250 mgKOH/g in material solid content equivalent. The A block and B block can also be paraphrased as an "A segment" and a "B segment", respectively. Hereinafter, the ABA block copolymer may also be referred to as the block copolymer.

The block copolymer preferably contains 90% by mass or more structural unit derived from a (meth) acrylic vinyl monomer. The two A blocks of the block copolymer may have the same structure or different structures.

The "vinyl monomer" in the present invention refers to a monomer whose molecule has a radically polymerizable carbon-carbon double bond, and the "structural unit derived from a vinyl monomer" in the present invention refers to a structural unit in which the radically polymerizable carbon-carbon double bond in the vinyl monomer has been turned into a carbon-carbon single bond. Furthermore, "(meth) acrylic" refers to "at least one of acrylic and methacrylic", "(meth)acrylic acid" refers to "at least one of acrylic acid and methacrylic acid", "(meth)acrylate" refers to "at least one of acrylate and methacrylate", and "(meth)acryloyl" refers to "at least one of acryloyl and methacryloyl".

The block copolymer according to the present invention is an ABA (hydrophilic-hydrophobic-hydrophilic) block copolymer formed of hydrophilic A blocks and a hydrophobic B block. It is considered that when an AB (hydrophilic-hydrophobic) block copolymer is used as a pigment dispersant in an aqueous medium, collected hydrophobic portions firmly adsorb to the pigment surface, while hydrophilic portions having high hydrophilicity experience electrostatic repulsion and steric repulsion to prevent aggregation of the pigment, thus giving high dispersibility. On the other hand, an ABA (hydrophilic-hydrophobic-hydrophilic) block copolymer has hydrophilic portions at both ends of the hydrophobic portion which is a pigment-adsorbing portion. Therefore, the size of its hydrophilic portions is small and the number of blocks is large as compared to a corresponding AB block copolymer. For this reason, the ABA block copolymer can be assumed to be able to not only maintain high dispersion stability but also collect pigment particles at high concentration after printing and drying, which enables provision of a high print density. Furthermore, in the case of the ABA block copolymer, it can be assumed that because the pigment-adsorbing portion after the printing and drying is immobilized by physical cross-linkage between the hydrophilic portions at both the ends, high fixability is exhibited as compared to the corresponding AB block copolymer. Moreover, it can be assumed that in this case, because the A block contains a (meth) acrylic acid alkyl ester whose carbon chain has two or more ester groups, a print coating is given flexibility and higher fixability can be thus offered.

The acid value of the block copolymer according to the present invention is 30 to 250 mgKOH/g in material solid content equivalent and the content of the structural unit derived from a vinyl monomer with an acid group in the A block is controlled so that the acid value of the block copolymer falls within the above range. If the above acid value is less than 30 mgKOH/g, the affinity for the aqueous medium becomes low, resulting in failure to achieve a dissolved and dispersed state of the block copolymer. On the other hand, if the acid value is over 250 mgKOH/g, the affinity for the aqueous medium becomes excessively high, so that the block copolymer dissolves in the aqueous dispersion medium. The lower limit of the acid value of the block copolymer is preferably 50 mgKOH/g and more preferably 70 mgKOH/g. The upper limit of the acid value of the block copolymer is preferably 160 mgKOH/g and more preferably 140 mgKOH/g.

The molecular weight of the block copolymer is measured in polystyrene equivalent by a gel permeation chromatography (hereinafter referred to as a "GPC") process. The lower limit of the weight-average molecular weight (Mw) of the block copolymer is preferably 5,000 and more preferably 7,000. The upper limit of the weight-average molecular weight (Mw) is preferably 50,000 and more preferably 30,000. The polydispersity index (PDI) is preferably less than 2.0, more preferably less than 1.8, and still more preferably less than 1.7. In the present invention, the polydispersity index (PDI) is obtained by (the weight-average molecular weight (Mw) of the block copolymer)/(the number average molecular weight (Mn) of the block copolymer). As the PDI is smaller, a copolymer having a narrower molecular weight distribution width and therefore closer molecular weights can be obtained. When the PDI value is 1.0, the molecular weight distribution width is narrowest. On the contrary, as the PDI is larger, the copolymer includes portions having smaller molecular weights or larger molecular weights than the designed copolymer molecular weight, which may deteriorate the pigment dispersibility. The reason for this is that polymer portions having an excessively small molecular weight may be excessively high in solubility in the aqueous medium and polymer portions having an excessively large molecular weight may be poor in solubility in the aqueous medium.

The content of the B block is preferably 20 to 80% by mass and more preferably 20 to 50% by mass in 100% by mass of the entire block copolymer. Furthermore, the content ratio between the two A blocks in the block copolymer is preferably adjusted within a range of (50:50) to (70:30) by mass. By adjusting the contents of the A block and B block within the above ranges, the hydrophobic portion and the hydrophilic portions can be controlled to have the desired function. In the block copolymer according to the present invention, the A blocks at both ends may have symmetric structures or asymmetric structures.

A description will be given below of the blocks of the block copolymer according to the present invention and a method for producing the block copolymer.

(A Block)

The A block is a hydrophilic polymer block containing a structural unit represented by a general formula (1) below and a structural unit derived from a vinyl monomer with an acid group. Each structural unit contained in the A block may be contained in any copolymeric form, such as random copolymerization or block copolymerization, in the A block, but is preferably contained in the form of random copolymerization from the viewpoint of homogeneity. For example, the A block may be formed of a copolymer of a structural unit consisting of an a1 block and a structural unit consisting of an a2 block.

[Chem. 2]

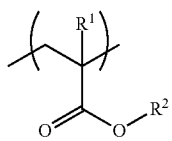

(1)

In the general formula (1), $R^1$ is a hydrogen atom or a methyl group and $R^2$ is an alkyl group having 2 to 10 carbon atoms.

Specific examples of the alkyl group having 2 to 10 carbon atoms represented by $R^2$ include an ethyl group, an n-propyl group, an isopropyl group, an n-butyl group, an isobutyl group, a sec-butyl group, a tert-butyl group, a pentyl group, a hexyl group, a heptyl group, an octyl group, a nonyl group, a decyl group, and other linear or branched alkyl groups. $R^2$ is preferably an alkyl group having 2 to 8 carbon atoms and more preferably an alkyl group having 3 to 5 carbon atoms.

Specific examples of the vinyl monomer forming the structural unit represented by the general formula (1) include ethyl (meth)acrylate, n-propyl (meth)acrylate, n-butyl (meth)acrylate, isobutyl (meth)acrylate, sec-butyl (meth) acrylate, tert-butyl (meth)acrylate, and 2-ethylhexyl (meth) acrylate. Preferred among them is n-butyl (meth)acrylate.

Examples of the acid group of the vinyl monomer with an acid group for use in the A block include a carboxyl group, a sulfonic acid group, and a phosphoric acid group. Specific examples of the vinyl monomer with an acid group include: vinyl monomers with a carboxyl group, such as (meth) acrylic acid, crotonic acid, maleic acid, itaconic acid, and monomers formed by reacting hydroxyalkyl (meth)acrylate, such as 2-hydroxyethyl (meth)acrylate or 4-hydroxybutyl (meth)acrylate, with an acid anhydride, such as maleic anhydride, succinic anhydride or phthalic anhydride; vinyl monomers with a sulfonic acid group, such as styrene sulfonic acid, (meth)acrylamide dimethyl propyl sulfonic acid, ethyl (meth)acrylate sulfonic acid, ethyl (meth)acrylamide sulfonic acid, and vinyl sulfonic acid; and vinyl monomers with a phosphoric acid group, such as methacryloyloxyethyl phosphoric acid esters. Preferred among them are vinyl monomers with a carboxyl group and more preferred is (meth)acrylic acid. (Meth)acrylic acid has a small molecular weight and, therefore, the amount thereof compounded in a monomer composition for polymerization can be large, which enables a further increase in the acid value of the block copolymer.

The A block may contain only the structural unit represented by the general formula (1) above and the structural unit derived from a vinyl monomer with an acid group or may further contain other structural units insofar as the hydrophilicity of the A block can be maintained.

The content of the structural unit represented by the general formula (1) is, in 100% by mass of the A block, preferably 20 to 80% by mass, more preferably 30 to 70% by mass, and still more preferably 40 to 60% by mass.

The content of the structural unit derived from a vinyl monomer with an acid group is, in 100% by mass of the A block, preferably 5 to 40% by mass, more preferably 10 to 35% by mass, and still more preferably 10 to 30% by mass.

The content of the other structural units that can be contained in the A block is, in 100% by mass of the A block, preferably 5 to 40% by mass, more preferably 10 to 35% by mass, still more preferably 10 to 31% by mass, and particularly preferably 10 to 30% by mass.

There is no particular limitation as to the other structural units that can be contained in the A block, insofar as they are formed of a vinyl monomer that can be copolymerized with all of the vinyl monomer forming the structural unit represented by the general formula (1), the vinyl monomer with an acid group, and the vinyl monomer forming the B block. Specific examples of the vinyl monomer that can form the other structural units in the A block include: methyl (meth) acrylate; (meth)acrylates with a hydroxyl group, such as 2-hydroxyethyl (meth)acrylate, 3-hydroxypropyl (meth) acrylate, 2-hydroxypropyl (meth)acrylate, and 4-hydroxybutyl (meth)acrylate; (meth)acrylates with a polyethylene glycol structural unit, such as diethylene glycol mono(meth) acrylate, triethylene glycol mono(meth)acrylate, tetraethylene glycol mono (meth)acrylate, polyethylene glycol mono (meth)acrylate, methoxydiethylene glycol (meth)acrylate, methoxytriethylene glycol (meth)acrylate, methoxytetraethylene glycol (meth)acrylate, and methoxypolyethylene glycol (meth)acrylate; (meth)acrylates with an alicyclic alkyl group, such as cyclohexyl (meth)acrylate, methylcyclohexyl (meth)acrylate, cyclododecyl (meth)acrylate, bornyl (meth) acrylate, isobornyl (meth)acrylate, dicyclopentanyl (meth) acrylate, dicyclopentenyl (meth)acrylate, and dicyclopentenyloxyethyl (meth)acrylate; (meth)acrylates with an aromatic ring group, such as benzyl (meth)acrylate, phenyl (meth)acrylate, and phenoxyethyl (meth)acrylate; and aromatic vinyl monomers, such as styrene, α-methylstyrene, 4-methylstyrene, 2-methylstyrene, 3-methylstyrene, 4-methoxystyrene, 2-hydroxymethylstyrene, and 1-vinylnaphthalene. Preferred among them are methyl (meth)acrylate, (meth)acrylates with a hydroxyl group, and (meth) acrylates with a polyethylene glycol structural unit.

The vinyl monomers for use in the A block can be used alone or in combination of two or more.

(B Block)

The B block is a hydrophobic polymer block containing a structural unit derived from a vinyl monomer with an aromatic ring group or an alicyclic alkyl group. In the case where the B block contains two or more types of structural units, each structural unit contained in the B block may be contained in any copolymeric form, such as random copolymerization or block copolymerization, in the B block, but is preferably contained in the form of random copolymerization from the viewpoint of homogeneity. For example, the B block may be formed of a copolymer of a structural unit consisting of a b1 block and a structural unit consisting of a b2 block.

Examples of the vinyl monomer with an aromatic ring group include: (meth)acrylates with an aromatic ring group, such as benzyl (meth)acrylate, phenyl (meth)acrylate, and phenoxyethyl (meth)acrylate; and aromatic vinyl monomers, such as styrene, α-methylstyrene, 4-methylstyrene, 2-methylstyrene, 3-methylstyrene, 4-methoxystyrene, 2-hydroxymethylstyrene, and 1-vinylnaphthalene. Preferred are vinyl monomers with an aromatic ring group having 6 to 15 carbon atoms.

Examples of the vinyl monomer with an alicyclic alkyl group include (meth)acrylates with an alicyclic alkyl group, such as cyclohexyl (meth)acrylate, methylcyclohexyl (meth)acrylate, cyclododecyl (meth)acrylate, bornyl (meth)acrylate, isobornyl (meth)acrylate, dicyclopentanyl (meth)acrylate, dicyclopentenyl (meth)acrylate, and dicyclopentenyloxyethyl (meth)acrylate. Preferred are vinyl monomers with an alicyclic alkyl group having 6 to 15 carbon atoms.

Preferred among the above vinyl monomers are vinyl monomers with an aromatic ring group and more preferred are (meth)acrylates with an aromatic ring group.

The B block may contain only the structural unit derived from a vinyl monomer with an aromatic ring group or an alicyclic alkyl group or may further contain other structural units insofar as the hydrophobicity of the B block can be maintained.

The content of the structural unit derived from a vinyl monomer with an aromatic ring group or an alicyclic alkyl group is, in 100% by mass of the B block, preferably 80 to 100% by mass, more preferably 90 to 100% by mass, and still more preferably 95 to 100% by mass.

The content of the other structural units that can be contained in the B block is, in 100% by mass of the B block, preferably 0 to 20% by mass, more preferably 0 to 10% by mass, and still more preferably 0 to 5% by mass.

There is no particular limitation as to the other structural units that can be contained in the B block, insofar as they are formed of a vinyl monomer that can be copolymerized with all of the vinyl monomer forming the A block and the vinyl monomer with an aromatic ring group or an alicyclic alkyl group. Specific examples of the vinyl monomer that can form the other structural units in the B block include: (meth)acrylic acid alkyl esters, such as methyl (meth)acrylate, ethyl (meth)acrylate, n-propyl (meth)acrylate, n-butyl (meth)acrylate, isobutyl (meth)acrylate, sec-butyl (meth)acrylate, tert-butyl (meth)acrylate, cyclohexyl (meth)acrylic acid, and 2-ethylhexyl (meth)acrylate; vinyl monomers with a carboxyl group, such as (meth)acrylic acid, crotonic acid, maleic acid, itaconic acid, and monomers formed by reacting hydroxyalkyl (meth)acrylate, such as 2-hydroxyethyl (meth)acrylate or 4-hydoxybutyl (meth)acrylate, with an acid anhydride, such as maleic anhydride, succinic anhydride or phthalic anhydride; vinyl monomers with a sulfonic acid group, such as styrene sulfonic acid, (meth)acrylamide dimethyl propyl sulfonic acid, ethyl (meth)acrylate sulfonic acid, ethyl (meth)acrylamide sulfonic acid, and vinyl sulfonic acid; vinyl monomers with a phosphoric acid group, such as methacryloyloxyethyl phosphoric acid esters; (meth)acrylates with a hydroxyl group, such as 2-hydroxyethyl (meth)acrylate, 3-hydroxypropyl (meth)acrylate, 2-hydroxypropyl (meth)acrylate, and 4-hydroxybutyl (meth)acrylate; and (meth)acrylates with a polyethylene glycol structural unit, such as diethylene glycol mono(meth)acrylate, triethylene glycol mono(meth)acrylate, tetraethylene glycol mono (meth)acrylate, polyethylene glycol mono(meth)acrylate, methoxydiethylene glycol (meth)acrylate, methoxytriethylene glycol (meth)acrylate, methoxytetraethylene glycol (meth)acrylate, and methoxypolyethylene glycol (meth)acrylate.

The vinyl monomers for use in the B block can be used alone or in combination of two or more.

(Method for Producing ABA Block Copolymer)

As a method for producing an ABA block copolymer according to the present invention, an ABA triblock may be produced by producing an A block by a polymerization reaction of a vinyl monomer, polymerizing a monomer for a B block with the A block to produce an AB diblock, and then polymerizing a monomer for an A block with the AB diblock, or an ABA triblock may be produced by producing two AB diblocks and then coupling the B blocks contained in the AB diblocks together.

For example, the above block copolymer can be obtained by using a living radical polymerization process to allow respective vinyl monomers forming the blocks to undergo a polymerization reaction one after another. A specific example that can be cited is a polymerization method using a living radical polymerization process, the method including the steps of: polymerizing a vinyl monomer forming one of two A blocks to form a polymer of the one A block; after forming the polymer of the one A block, polymerizing a vinyl monomer forming a B block to form a polymer of the B block; and, after forming the polymer of the B block, polymerizing a vinyl monomer forming the other of the two A blocks to form a polymer of the other A block.

A conventional radical polymerization process may cause deactivations of growing ends owing not only to the initiation reaction and the propagation reaction but also to the termination reaction and the chain-transfer reaction, which tends to form a polymer mixture having various molecular weights and a heterogeneous composition. The living radical polymerization process is, while keeping the convenience and versatility of the conventional radical polymerization process, less likely to cause the termination reaction and the chain-transfer, so that growing ends propagate without deactivating. Therefore, the living radical polymerization process is preferred in that it can facilitate accurate control of the molecular weight distribution and production of a polymer having a homogeneous composition. The living radical polymerization process is classified, according to the approach for stabilizing polymerization growing ends, into the process using a transition metal catalyst (ATRP process), the process using a sulfur-based, reversible chain-transfer agent (RAFT process), the process using an organotellurium compound (TERP process), and so on. The ATRP process does not protect acid groups of an acid group-containing vinyl monomer because of the use of an amine complex and, therefore, may not be able to be used. In the case of using many types of monomers, the RAFT process is less likely to provide a low molecular weight distribution and may have problems of sulfurous smell, coloration, and so on. Among these processes, the TERP process is preferably used from the viewpoints of the variety of usable monomers, molecular weight control in a high molecular weight region, homogeneous composition or coloration.

The TERP process is a process for polymerizing a radical polymerizable compound (vinyl monomer) using an organotellurium compound as a polymerization initiator and, for example, a process described in WO 2004/14848, WO 2004/14962, WO 2004/072126, and WO 2004/096870. Specific examples include processes for polymerizing a vinyl monomer using one of the following initiators (a) to (d).

(a) an organotellurium compound represented by the general formula (2), (b) a mixture of an organotellurium compound represented by the general formula (2) and an azo polymerization initiator, (c) a mixture of an organotellurium compound represented by the general formula (2) and an organoditellurium compound represented by the general formula (3), and (d) a mixture of an organotellurium compound represented by the general formula (2), an azo polymerization initiator, and an organoditellurium compound represented by the general formula (3).

[Chem. 3]

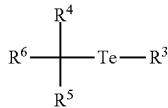
(2)

In the general formula (2), $R^3$ represents an alkyl group having 1 to 8 carbon atoms, an aryl group or an aromatic heterocyclic group, $R^4$ and $R^5$ each independently represent a hydrogen atom or an alkyl group having 1 to 8 carbon atoms, and $R^6$ represents an alkyl group having 1 to 8 carbon atoms, an aryl group, a substituted aryl group, an aromatic heterocyclic group, an alkoxy group, an acyl group, an amide group, an oxycarbonyl group a cyano group, an allyl group or a propargyl group.

$(R^3Te)_2$ (3)

In the general formula (3), $R^3$ represents an alkyl group having 1 to 8 carbon atoms, an aryl group or an aromatic heterocyclic group.

The group represented by $R^3$ is an alkyl group having 1 to 8 carbon atoms, an aryl group or an aromatic heterocyclic group and specific examples are as follows.

Examples of the alkyl group having 1 to 8 carbon atoms include: a methyl group, an ethyl group, an n-propyl group, an isopropyl group, an n-butyl group, an isobutyl group, a sec-butyl group, a tert-butyl group, a pentyl group, a hexyl group, a heptyl group, an octyl group, and other linear or branched alkyl groups; and a cyclohexyl group and other cyclic alkyl groups. Preferred are linear or branched alkyl groups having 1 to 4 carbon atoms and more preferred are a methyl group and an ethyl group.

Examples of the aryl group include a phenyl group and a naphthyl group.

Examples of the aromatic heterocyclic group include a pyridyl group, a furyl group, and a thienyl group.

The groups represented by $R^4$ and $R^5$ are each independently a hydrogen atom or an alkyl group having 1 to 8 carbon atoms, and each group is specifically as follows.

Examples of the alkyl group having 1 to 8 carbon atoms include: a methyl group, an ethyl group, an n-propyl group, an isopropyl group, an n-butyl group, an isobutyl group, a sec-butyl group, a tert-butyl group, a pentyl group, a hexyl group, a heptyl group, an octyl group, and other linear or branched alkyl groups; and a cyclohexyl group and other cyclic alkyl groups. Preferred are linear or branched alkyl groups having 1 to 4 carbon atoms and more preferred are a methyl group and an ethyl group.

The group represented by $R^6$ is an alkyl group having 1 to 8 carbon atoms, an aryl group, a substituted aryl group, an aromatic heterocyclic group, an alkoxy group, an acyl group, an amide group, an oxycarbonyl group a cyano group, an allyl group or a propargyl group and specific examples are as follows.

Examples of the alkyl group having 1 to 8 carbon atoms include: a methyl group, an ethyl group, an n-propyl group, an isopropyl group, an n-butyl group, an isobutyl group, a sec-butyl group, a tert-butyl group, a pentyl group, a hexyl group, a heptyl group, an octyl group, and other linear or branched alkyl groups; and a cyclohexyl group and other cyclic alkyl groups. Preferred are linear or branched alkyl groups having 1 to 4 carbon atoms and more preferred are a methyl group and an ethyl group.

Examples of the aryl group include a phenyl group and a naphthyl group. Preferred is a phenyl group.

Examples of the substituted aryl group include a substituent-bearing phenyl group and a substituent-bearing naphthyl group. Examples of the substituent of the substituent-bearing aryl group include a halogen atom, a hydroxyl group, an alkoxy group, an amino group, a nitro group, a cyano group, a carbonyl-containing group represented by —$COR^{61}$ (where $R^{61}$ is an alkyl group having 1 to 8 carbon atoms, an aryl group, an alkoxy group having 1 to 8 carbon atoms or an aryloxy group), a sulfonyl group, and a trifluoromethyl group. Furthermore, the substituted aryl group is preferably monosubstituted or disubstituted.

Examples of the aromatic heterocyclic group include a pyridyl group, a furyl group, and a thienyl group.

The preferred alkoxy group is a group in which an alkyl group having 1 to 8 carbon atoms is bonded to an oxygen atom, and examples include a methoxy group, an ethoxy group, a propoxy group, an isopropoxy group, an n-butoxy group, a sec-butoxy group, a tert-butoxy group, a pentyloxy group, a hexyloxy group, a heptyloxy group, and an octyloxy group.

Examples of the acyl group include an acetyl group, a propionyl group, and a benzoyl group.

An example of the amide group is —$CONR^{621}R^{622}$ (where $R^{621}$ and $R^{622}$ are each independently a hydrogen atom, an alkyl group having 1 to 8 carbon atoms or an aryl group).

The preferred oxycarbonyl group is a group represented by —$COOR^{63}$ (where $R^{63}$ is a hydrogen atom, an alkyl group having 1 to 8 carbon atoms or an aryl group) and examples include a carboxyl group, a methoxycarbonyl group, an ethoxycarbonyl group, a propioxycarbonyl group, an n-butoxycarbonyl group, a sec-butoxycarbonyl group, a ter-butoxycarbonyl group, an n-pentoxycarbonyl group, and a phenoxycarbonyl group. Preferred among them are a methoxycarbonyl group and an ethoxycarbonyl group.

An example of the allyl group is —$CR^{641}R^{642}$— $CR^{643}$=$CR^{644}R^{645}$ (where $R^{641}$ and $R^{642}$ are each independently a hydrogen atom or an alkyl group having 1 to 8 carbon atoms, $R^{643}$, $R^{644}$, and $R^{645}$ are each independently a hydrogen atom, an alkyl group having 1 to 8 carbon atoms or an aryl group, and their respective substituents may be linked by a ring structure). An example of the propargyl group is —$CR^{651}R^{652}$—$CR^{653}$ (where $R^651$ and $R^{652}$ are each a hydrogen atom or an alkyl group having 1 to 8 carbon atoms, and $R^{653}$ is a hydrogen atom, an alkyl group having 1 to 8 carbon atoms, an aryl group or a silyl group).

Specific examples of the organotellurium compound represented by the general formula (2) include all of the organotellurium compounds described in WO 2004/14848, WO 2004/14962, WO 2004/072126, and WO 2004/096870, such as (methyltelluromethyl)benzene, (methyltelluromethyl)naphthalene, ethyl-2-methyl-2-methyltelluro-propionate, ethyl-2-methyl-2-n-butyltelluro-propionate, (2-trimethylsiloxyethyl)-2-methyl-2-methyltelluro-propionate, (2-hydroxyethyl)-2-methyl-2-methyltelluro-propionate, and (3-trimethylsilylpropargyl)-2-methyl-2-methyltelluro-propionate.

Specific examples of the organoditellurium compounds represented by the general formula (3) include dimethyl ditelluride, diethyl ditelluride, di-n-propyl ditelluride, diisopropyl ditelluride, dicyclopropyl ditelluride, di-n-butyl ditelluride, di-s-butyl ditelluride, di-t-butyl ditelluride, dicyclobutyl ditelluride, diphenyl ditelluride, bis-(p-methoxyphenyl) ditelluride, bis-(p-aminophenyl) ditelluride, bis-(p-nitrophenyl) ditelluride, bis-(p-cyanophenyl) ditelluride, bis-(p-sulfonylphenyl) ditelluride, dinaphthyl ditelluride, and dipyridyl ditelluride.

Any azo polymerization initiator can be used without particular limitation insofar as it is usable in usual radical polymerization. Examples thereof include 2,2'-azobis-isobutyronitrile (AIBN), 2,2'-azobis(2-methylbutyronitrile) (AMBN), 2,2'-azobis(2,4-dimethylvaleronitrile) (ADVN), 1,1'-azobis(l-cyclohexanecarbonitrile) (ACHN), dimethyl-2,2'-azobisisobutyrate (MAIB), 4,4'-azobis(4-cyanovaleric acid) (ACVA), 1,1'-azobis(1-acetoxy-1-phenylethane), 2,2'-azobis(2-methylbutylamide), 2,2'-azobis(4-methoxy-2,4-dimethylvaleronitrile) (V-70), 2,2'-azobis(2-methylamidinopropane) dihydrochloride, 2,2'-azobis[2-(2-imidazoline-2-yl)propane], 2,2'-azobis[2-methyl-N-(2-hydroxyethyl) propionamide], 2,2'-azobis(2,4,4-trimethylpentane), 2-cyano-2-propylazoformamide, 2,2'-azobis(N-butyl-2-methylpropionamide), and 2,2'-azobis(N-cyclohexyl-2-methylpropionamide).

The amount of vinyl monomer used in the above (a), (b), (c), and (d) is appropriately adjusted according to the physical properties of a desired copolymer, but, generally, the vinyl monomer is preferably used in an amount of 5 to 10000 mol relative to 1 mol of organotellurium compound of the general formula (2).

In the case of using, in the above (b), an organotellurium compound of the general formula (2) and an azo polymerization initiator in combination, the amount of azo polymerization initiator used is generally preferably 0.01 to 10 mol relative to 1 mol of organotellurium compound of the general formula (2).

In the case of using, in the above (c), an organotellurium compound of the general formula (2) and an organoditellurium compound of the general formula (3) in combination, the amount of organoditellurium compound of the general formula (3) used is generally preferably 0.01 to 100 mol relative to 1 mol of organotellurium compound of the general formula (2).

In the case of using, in the above (d), an organotellurium compound of the general formula (2), an organoditellurium compound of the general formula (3), and an azo polymerization initiator in combination, the amount of azo polymerization initiator used is generally preferably 0.01 to 100 mol relative to the sum of 1 mol of organotellurium compound of the general formula (2) and organoditellurium compound of the general formula (3).

Polymerization reaction can be conducted even in the absence of solvent, but may be conducted, using an aprotic solvent or protic solvent commonly used for radical polymerization, by stirring the above mixture. Examples of the aprotic solvent that can be used include benzene, toluene, N,N-dimethylformamide (DMF), dimethyl sulfoxide (DMSO), acetone, 2-butanone (methyl ethyl ketone), dioxane, hexafluoroisopropanol, propylene glycol monomethyl ether acetate, chloroform, carbon tetrachloride, tetrahydrofuran (THF), ethyl acetate, propylene glycol monomethyl ether acetate, and trifluoromethylbenzene. Examples of protic solvents include water, methanol, ethanol, isopropanol, n-butanol, ethyl cellosolve, butyl cellosolve, 1-methoxy-2-propanol, and diacetone alcohol.

The amount of solvent used is appropriately adjusted, for example, generally within a range of 0.01 to 50 ml, preferably within a range of 0.05 to 10 ml, and more preferably within a range of 0.1 to 1 ml relative to 1 g of vinyl monomer.

The reaction temperature and the reaction time are appropriately adjusted depending on the molecular weight or molecular weight distribution of a copolymer to be obtained, but the mixture is generally stirred at 0 to 150° C. for 1 minute to 100 hours. The TERP process can provide a high yield and an accurate molecular weight distribution even at a low polymerization temperature and even for a short polymerization time.

After the end of the polymerization reaction, a desired copolymer can be separated from the resultant reaction mixture by usual separation and refinement means.

The growing ends of the copolymer obtained by the polymerization reaction take the form of —$TeR^3$ (where $R^3$ is the same as described above) derived from a tellurium compound and deactivated by an operation in air, but tellurium atoms may remain. The copolymer with tellurium atoms remaining at the ends is colored and has poor thermal stability. To cope with this, a radical reduction method using tributylstannane, a thiol compound or the like, a method for adsorbing the tellurium atoms with activated carbon, silica gel, activated alumina, activated white earth, molecular sieves, a polymer adsorbent or the like, a method for adsorbing metal with an ion-exchange resin or the like, a liquid-liquid extraction method or solid-liquid extraction method for oxidatively separating tellurium atoms at the ends of the copolymer by addition of a peroxide, such as hydrogen peroxide water or benzoyl peroxide or flowing air or oxygen into the system and then removing the residual tellurium compound by water rinse or a combination of appropriate solvents, or a solution-phase purification method, such as ultrafiltration for extracting and removing only molecules equal to or less than a particular molecular weight, can be used or these method can be used in various combinations.

<Dispersant and Pigment Dispersion Composition>

A pigment dispersion composition according to this embodiment contains: a dispersant containing the above block copolymer and/or a neutralized product of the above block copolymer; a pigment; and an aqueous medium. Hereinafter, a description will be given of each of various components of the pigment dispersion composition.

The dispersant according to the present invention may be used without neutralizing the acid groups in the above block copolymer or by neutralizing all or part of the acid groups, but is preferably used by neutralizing all or part of the acid groups. The use of the dispersant with the acid groups neutralized makes the dispersed state of the pigment stable and thus enables the provision of a pigment dispersion composition having more excellent long-term storage stability. Specifically, the dispersant is preferably used in a neutralized state to have a pH value of 6 to 9.

For the neutralization, for example, a hydroxide of an alkali metal, such as potassium hydroxide or sodium hydroxide, or an organic amine, such as ammonia, dimethylamine, diethylamine, triethylamine, monoethanolamine, diethanolamine, triethanolamine or dimethylethanolamine, can be used. The percentage of the acid groups neutralized is preferably 30 to 100% and more preferably 40 to 90%.

The amount of dispersant compounded in the pigment dispersion composition according to the present invention is, relative to 100 parts by mass of pigment, preferably 5 to 100 parts by mass, more preferably 10 to 80 parts by mass, and still more preferably 10 to 70 parts by mass. If the amount of dispersant compounded is too small, the pigment may not be able to sufficiently be dispersed. If the amount of pigment dispersant compounded is too large, the pigment dispersant not adsorbing to the pigment is present in the aqueous dispersion medium, which is undesirable.

Any organic pigment or any inorganic pigment can be used without particular limitation as the pigment for use in the present invention and examples include various colored pigments, such as a red pigment, a yellow pigment, an orange pigment, a blue pigment, a green pigment, a violet pigment, and a black pigment. Examples of the organic pigment include: azo pigments, including monoazo, diazo, and condensed diazo pigments; and polycyclic pigments, including diketopyrrolopyrrole, phthalocyanine, isoindolinone, isoindoline, quinacridone, indigo, thioindigo, quinophthalone, dioxazine, anthraquinone, perylene, and perinone pigments. Examples of the inorganic pigment include carbon black pigments, such as furnace black, lamp black, acetylene black, and channel black.

The pigment contained in the pigment dispersion composition is preferably used with the selection of the type of pigment, the particle diameter, and the type of treatment according to the purpose. Furthermore, the number of types of pigments contained in the pigment dispersion composition may be single or may be two or more.

Specific examples of the pigment include: red pigments, such as CI Pigment Red 7, 9, 14, 41, 48:1, 48:2, 48:3, 48:4, 81:1, 81:2, 81:3, 122, 123, 146, 149, 168, 177, 178, 179, 187, 200, 202, 208, 210, 215, 224, 254, 255, and 264; yellow pigments, such as CI Pigment Yellow 1, 3, 5, 6, 14, 55, 60, 61, 62, 63, 65, 73, 74, 77, 81, 93, 97, 98, 104, 108, 110, 128, 138, 139, 147, 150, 151, 154, 155, 166, 167, 168, 170, 180, 188, 193, 194, and 213; orange pigments, such as CI Pigment Orange 36, 38, and 43; blue pigments, such as CI Pigment Blue 15, 15:2, 15:3, 15:4, 15:6, 16, 22, and 60; green pigments, such as CI Pigment Green 7, 36, and 58; violet pigments, such as CI Pigment Violet 19, 23, 32, and 50; and black pigments, such as CI Pigment Black 7. Preferred among them are, for example, CI Pigment Red 122, CI Pigment Yellow 74, 128, 155, CI Pigment Blue 15:3, 15:4, 15:6, CI Green 7, 36, CI Pigment Violet 19, and CI Pigment Black 7.

There is no particular limitation as to the concentration of pigment in the pigment dispersion composition according to the present invention insofar as it is a concentration giving a sufficient color density to a recorded medium, but it is preferably 1 to 30% by mass and more preferably 1 to 20% by mass. The pigment concentration is yet still more preferably 1 to 10% by mass. If the pigment concentration is above 30% by mass, the density of pigment in the aqueous medium becomes high, which may cause a problem of aggregation of pigment particles due to inhibition of their free migration.

Water or water-soluble organic solvents can be used as the aqueous dispersion medium for use in the present invention and they may be used alone or in combination of two or more thereof. Pure water or ion-exchange water (deionized water) is preferably used as the water. Examples of the water-soluble organic solvent that can be used include: alcohols, such as methyl alcohol, ethyl alcohol, n-propyl alcohol, isopropyl alcohol, n-butyl alcohol, sec-butyl alcohol, and tert-butyl alcohol; glycols, such as ethylene glycol, propylene glycol, butylene glycol, triethylene glycol, 1,2,6-hexane triol, thiodiglycol, hexylene glycol, diethylene glycol, triethylene glycol, tetraethylene glycol, and polyethylene glycol; glycol ethers, such as ethylene glycol monomethyl ether, ethylene glycol monoethyl ether, ethylene glycol monobutyl ether, ethylene glycol monohexyl ether, diethylene glycol methyl ether, diethylene glycol ethyl ether, triethylene glycol monomethyl ether, triethylene glycol monoethyl ether, and triethylene glycol monobutyl ether; polyalcohols, such as 1,2-butanediol, 1,2-pentanediol, 1,2-hexanediol, and glycerin; and nitrogen-containing compounds, such as N-methyl-2-pyrrolidone, 2-pyrrolidone, and 1,3-dimethyl-2-imidazolidinone. The content of the water-soluble organic solvent is preferably 0 to 100 parts by mass relative to 100 parts by mass of water.

There is no particular limitation as to the method for dispersing the pigment or the like using the dispersant according to the present invention, and any heretofore known method can be applied. For example, dispersion can be achieved by mixing the block copolymer according to the present invention neutralized with alkali, the pigment, and the aqueous medium using a mixer-disperser, such as a paint shaker, a bead mill, a ball mill, dissolver or a kneader.

The pigment dispersion composition according to the present invention may contain other additives as necessary. Examples of the other additives include a viscosity modifier, a surface tension conditioner, a penetrant, a pigment derivative, an antioxidant, an ultraviolet ray absorber, a preservative, and a mildewcide.

The dispersant according to the present invention can give excellent dispersion stability to the pigment in the aqueous medium.

Printing of the pigment dispersion composition (ink) according to the present invention is performed, for example, by an ink-jet recording method including the step of printing ink on a recording medium by discharging the ink through an ink-jet recording head. The above-described ink according to the present invention is used in the printing step. The term "recording" in the present invention includes a manner of printing using the ink according to the present invention on plain paper, a manner of printing using the ink according to the present invention on a recording medium having an ink-acceptable layer on a surface thereof, and a manner of printing using the ink according to the present invention on a low-permeable recording medium, such as glass, plastic or film. Particularly, the use of the ink according to the present invention on the recording medium having an ink-acceptable layer on a surface thereof or on a low-permeable recording medium is more preferred, because the effects of the present invention (high print density and fixability) can be significantly achieved.

EXAMPLES

The present invention will be specifically described below in further detail with reference to examples. The present invention is not at all limited by the following examples and modifications and variations may be appropriately made therein without changing the gist of the invention. Measurements for various properties in Examples and Comparative Examples were made according to the following methods.

(Rate of Polymerization)

Each example was measured in term of $^1$H-NMR using an NMR (trade name: AVANCE 500, manufactured by Bruker BioSpin) and its rate of polymerization was calculated from the area ratio between the peak of the vinyl group of the monomer and the peak of the polymer.

(Weight-Average Molecular Weight (Mw) and Polydispersity Index (PDI))

A calibration curve was made using a GPC (trade name: HLC-8320GPC, manufactured by Tosoh Corporation), a column (trade name: TSKgel SuperMultipore HZ-H×2, manufactured by Tosoh Corporation), tetrahydrofuran as a mobile phase, and polystyrene (molecular weight: 2,890,000, 1,090,000, 775,000, 427,000, 190,000, 96,400, 37,900, 10,200, 2,630, and 440) as a standard to measure the weight-average molecular weight (Mw) and the number average molecular weight (Mn). The polydispersity index (PDI) was calculated from these measured values.

(Acid Value)

The acid value represents the weight of potassium hydroxide taken to neutralize an acid component per gram of solid content. A phenolphthalein solution was added to a solution of a measurement sample dissolved in tetrahydrofuran and the resultant solution was neutralized and titrated with a 0.1 M potassium hydroxide/2-propanol solution. It was determined that a titration end point was reached at the point when the solution was visually observed to turn red, and the acid value (A) was then calculated from the following equation.

$$A = 56.11 \times Vs \times 0.1 \times f/w$$

A: acid value (mgKOH/g),

Vs: amount of 0.1 M potassium hydroxide/2-propanol solution used for titration (mL), f: titer of 0.1 M potassium hydroxide/2-propanol solution, and w: weight of measurement sample (g) (in solid content equivalent).

(Viscosity)

The viscosity of the prepared pigment dispersion composition was measured at 25° C. and a number of rotor revolutions of 60 rpm by a model E viscometer (trade name: TVE-22L, manufactured by Toki Sangyo Co., Ltd.) using a conical rotor of 0.8°×R24. Thereafter, the pigment dispersion composition was preserved at 60° C. for seven days and its viscosity was measured in the same manner as above.

(Print Density (OD Value))

The pigment dispersion composition was filtered through a 1.2-μm pore diameter membrane filter made of cellulose acetate and then filled into an ink cartridge. The ink cartridge was loaded into an ink-jet printer (trade name: FX-045A, manufactured by Seiko Epson Corporation), a print was then made on a glossy paper (trade name: Shashin Yoshi-Kotaku Standard, manufactured by Canon Inc.), and the print was measured in terms of OD value with a spectrophotometer colorimeter (trade name: SpectroEye, manufactured by Gretag-Macbeth AG).

(Fixability (OD Value Retention))

A cellophane tape (trade name: CT-18S, manufactured by Nichiban Co., Ltd.) was attached to a printed portion after the above measurement of the OD value and peeled off and the printed portion was measured in terms of OD value again. The OD value retention was calculated from the following equation. As the printed portion exhibited a higher value of the OD value retention, it was determined to have higher fixability.

OD value retention(%)=(OD value after peeling of tape)/(OD value before attachment of tape)×100

Production of Copolymer

Example 1

An amount of 143.8 g of n-butyl methacrylate (hereinafter, referred to as "BMA"), 76.2 g of methyl methacrylate (hereinafter, referred to as "MMA"), 59.0 g of methacrylic acid (hereinafter, referred to as "MAA"), 24.0 g of ethyl-2-methyl-2-n-butyltelluro-propionate (hereinafter, referred to as "BTEE"), 14.8 g of dibutyl ditelluride (hereinafter, referred to as "DBDT"), 2.6 g of 2,2'-azobisisobutyronitrile (hereinafter, referred to as "AIBN"), 170.5 g of methyl ethyl ketone, and 170.5 g of acetonitrile were charged into a flask equipped with an argon gas introduction pipe and a stirrer blade, followed by allowing the mixture to undergo reaction at 60° C. for 18 hours. The rate of polymerization was 99%, Mw was 6,840, and PDI was 1.39.

Added to the above reaction solution was a mixed solution of 240.0 g of benzyl methacrylate (hereinafter, referred to as "BzMA"), 1.9 g of MAA, 2.6 g of AIBN, 90.0 g of methyl ethyl ketone, and 90.0 g of acetonitrile, previously placed in an argon-substituted atmosphere, followed by allowing the resultant mixture to undergo reaction at 60° C. for 9 hours. The rate of polymerization was 96%, Mw was 9,010, and PDI was 1.40.

Added to the above reaction solution was a mixed solution of 143.8 g of BMA, 76.2 g of MMA, 59.0 g of MAA, 1.3 g of AIBN, 62.1 g of methyl ethyl ketone, and 394.7 g of acetonitrile, previously placed in an argon-substituted atmosphere, followed by allowing the resultant mixture to undergo reaction at 60° C. for 23 hours. The rate of polymerization was 98%, Mw was 12,600, and PDI was 1.38.

After the end of the reaction, 3.6 kg of methyl ethyl ketone was added to the reaction solution and the mixture was introduced into 21 L of heptane being stirred. The resultant polymer precipitate was filtered by suction and dried to give a block copolymer. The acid value was 96 mgKOH/g. The results are shown in Table 1.

Example 2

An amount of 138.8 g of BMA, 73.5 g of MMA, 59.6 g of MAA, 23.3 g of BTEE, 14.3 g of DBDT, 2.6 g of AIBN, 166.1 g of methyl ethyl ketone, and 166.1 g of acetonitrile were charged into a flask equipped with an argon gas introduction pipe and a stirrer blade, followed by allowing the mixture to undergo reaction at 60° C. for 18 hours. The rate of polymerization was 99%, Mw was 6,920, and PDI was 1.30.

Added to the above reaction solution was a mixed solution of 233.0 g of BzMA, 23.3 g of MAA, 2.6 g of AIBN, 98.0 g of methyl ethyl ketone, and 98.0 g of acetonitrile, previously placed in an argon-substituted atmosphere, followed by allowing the resultant mixture to undergo reaction at 60° C. for 9 hours. The rate of polymerization was 98%, Mw was 9,910, and PDI was 1.33.

Added to the above reaction solution was a mixed solution of 138.8 g of BMA, 73.5 g of MMA, 59.6 g of MAA, 1.3 g of AIBN, 61.1 g of methyl ethyl ketone, and 388.5 g of acetonitrile, previously placed in an argon-substituted atmosphere, followed by allowing the resultant mixture to undergo reaction at 60° C. for 22 hours. The rate of polymerization was 100%, Mw was 13,800, and PDI was 1.34.

After the end of the reaction, 3.6 kg of methyl ethyl ketone was added to the reaction solution and the mixture was introduced into 21 L of heptane being stirred. The resultant polymer precipitate was filtered by suction and dried to give a block copolymer. The acid value was 100 mgKOH/g. The results are shown in Table 1.

Example 3

An amount of 60.7 g of BMA, 32.1 g of MMA, 26.1 g of MAA, 6.8 g of BTEE, 4.2 g of DBDT, 1.6 g of AIBN, 72.7 g of methyl ethyl ketone, and 72.7 g of acetonitrile were charged into a flask equipped with an argon gas introduction pipe and a stirrer blade, followed by allowing the mixture to undergo reaction at 60° C. for 18 hours. The rate of polymerization was 99%, Mw was 9,030, and PDI was 1.44.

Added to the above reaction solution was a mixed solution of 101.9 g of BzMA, 10.2 g of MAA, 1.6 g of AIBN, 68.5 g of methyl ethyl ketone, and 68.5 g of acetonitrile, previously placed in an argon-substituted atmosphere, followed by allowing the resultant mixture to undergo reaction at 60° C. for 8 hours. The rate of polymerization was 96%, Mw was 12,900, and PDI was 1.54.

Added to the above reaction solution was a mixed solution of 60.7 g of BMA, 32.1 g of MMA, 26.1 g of MAA, 0.8 g of AIBN, and 145.4 g of acetonitrile, previously placed in an argon-substituted atmosphere, followed by allowing the resultant mixture to undergo reaction at 60° C. for 15 hours. The rate of polymerization was 98%, Mw was 16,300, and PDI was 1.63.

After the end of the reaction, 2.3 kg of methyl ethyl ketone was added to the reaction solution and the mixture was introduced into 9.3 L of heptane being stirred. The resultant polymer precipitate was filtered by suction and dried to give a block copolymer. The acid value was 115 mgKOH/g. The results are shown in Table 1.

Example 4

An amount of 65.6 g of BMA, 34.7 g of MMA, 35.6 g of MAA, 9.8 g of BTEE, 5.7 g of DBDT, 1.0 g of AIBN, 83.1 g of methyl ethyl ketone, and 83.1 g of acetonitrile were charged into a flask equipped with an argon gas introduction pipe and a stirrer blade, followed by allowing the mixture to undergo reaction at 60° C. for 20 hours. The rate of polymerization was 99%, Mw was 7,600, and PDI was 1.38.

Added to the above reaction solution was a mixed solution of 116.5 g of BzMA, 11.7 g of MAA, 1.0 g of AIBN, 49.0 g of methyl ethyl ketone, and 49.0 g of acetonitrile, previously placed in an argon-substituted atmosphere, followed by allowing the resultant mixture to undergo reaction at 60° C. for 8 hours. The rate of polymerization was 96%, Mw was 10,600, and PDI was 1.35.

Added to the above reaction solution was a mixed solution of 65.6 g of BMA, 34.7 g of MMA, 35.6 g of MAA, 0.5 g of AIBN, 30.6 g of methyl ethyl ketone, and 194.2 g of acetonitrile, previously placed in an argon-substituted atmosphere, followed by allowing the resultant mixture to undergo reaction at 60° C. for 17 hours. The rate of polymerization was 98%, Mw was 15, 300, and PDI was 1.39.

After the end of the reaction, 1.8 kg of methyl ethyl ketone was added to the reaction solution and the mixture was introduced into 10.5 L of heptane being stirred. The resultant polymer precipitate was filtered by suction and dried to give a block copolymer. The acid value was 137 mgKOH/g. The results are shown in Table 1.

Example 5

An amount of 55.1 g of BMA, 29.2 g of MMA, 17.7 g of MAA, 4.8 g of BTEE, 3.0 g of DBDT, 0.5 g of AIBN, 62.3 g of methyl ethyl ketone, and 62.3 g of acetonitrile were charged into a flask equipped with an argon gas introduction pipe and a stirrer blade, followed by allowing the mixture to undergo reaction at 60° C. for 20 hours. The rate of polymerization was 98%, Mw was 9,730, and PDI was 1.40.

Added to the above reaction solution was a mixed solution of 87.4 g of BzMA, 8.7 g of MAA, 0.8 g of AIBN, 36.7 g of methyl ethyl ketone, and 36.7 g of acetonitrile, previously placed in an argon-substituted atmosphere, followed by allowing the resultant mixture to undergo reaction at 60° C. for 8 hours. The rate of polymerization was 97%, Mw was 14,200, and PDI was 1.39.

Added to the above reaction solution was a mixed solution of 55.1 g of BMA, 29.2 g of MMA, 17.7 g of MAA, 0.3 g of AIBN, and 168.6 g of acetonitrile, previously placed in an argon-substituted atmosphere, followed by allowing the resultant mixture to undergo reaction at 60° C. for 19 hours. The rate of polymerization was 98%, Mw was 20,000, and PDI was 1.42.

After the end of the reaction, 1.7 kg of methyl ethyl ketone was added to the reaction solution and the mixture was introduced into 7.9 L of heptane being stirred. The resultant polymer precipitate was filtered by suction and dried to give a block copolymer. The acid value was 98 mgKOH/g. The results are shown in Table 1.

Example 6

An amount of 68.5 g of BMA, 36.3 g of MMA, 14.2 g of MAA, 6.8 g of BTEE, 4.2 g of DBDT, 0.7 g of AIBN, 72.7 g of methyl ethyl ketone, and 72.7 g of acetonitrile were charged into a flask equipped with an argon gas introduction pipe and a stirrer blade, followed by allowing the mixture to undergo reaction at 60° C. for 21 hours. The rate of polymerization was 100%, Mw was 7,110, and PDI was 1.38.

Added to the above reaction solution was a mixed solution of 102.0 g of BzMA, 10.2 g of MAA, 0.7 g of AIBN, 42.8 g of methyl ethyl ketone, and 42.8 g of acetonitrile, previously placed in an argon-substituted atmosphere, followed by allowing the resultant mixture to undergo reaction at 60° C. for 10 hours. The rate of polymerization was 100%, Mw was 10,400, and PDI was 1.36.

Added to the above reaction solution was a mixed solution of 68.5 g of BMA, 36.3 g of MMA, 14.2 g of MAA, 0.4 g of AIBN, and 196.7 g of acetonitrile, previously placed in an argon-substituted atmosphere, followed by allowing the resultant mixture to undergo reaction at 60° C. for 19 hours. The rate of polymerization was 100%, Mw was 15,300, and PDI was 1.41.

After the end of the reaction, 2.0 kg of methyl ethyl ketone was added to the reaction solution and the mixture was introduced into 9.2 L of heptane being stirred. The resultant polymer precipitate was filtered by suction and dried to give a block copolymer. The acid value was 78 mgKOH/g. The results are shown in Table 1.

Example 7

An amount of 4.16 g of BMA, 2.20 g of MMA, 1.79 g of MAA, 0.70 g of BTEE, 0.43 g of DBDT, 0.08 g of AIBN, 6.20 g of methyl ethyl ketone, and 6.28 g of acetonitrile were charged into a flask equipped with an argon gas introduction pipe and a stirrer blade, followed by allowing the mixture to undergo reaction at 60° C. for 13 hours. The rate of polymerization was 96%, Mw was 5,790, and PDI was 1.48.

Added to the above reaction solution was a mixed solution of 7.00 g of cyclohexyl methacrylate (hereinafter, referred to as "CHMA"), 0.70 g of MAA, 0.8 g of AIBN, 2.94 g of methyl ethyl ketone, and 2.94 g of acetonitrile, previously placed in an argon-substituted atmosphere, followed by allowing the resultant mixture to undergo reaction at 60° C. for 10 hours. The rate of polymerization was 99%, Mw was 9,180, and PDI was 1.46.

Added to the above reaction solution was a mixed solution of 4.16 g of BMA, 2.20 g of MMA, 1.79 g of MAA, 0.08 g of AIBN, 1.84 g of methyl ethyl ketone, and 11.66 g of acetonitrile, previously placed in an argon-substituted atmosphere, followed by allowing the resultant mixture to undergo reaction at 60° C. for 24 hours. The rate of polymerization was 99%, Mw was 13,300, and PDI was 1.48.

After the end of the reaction, 108 g of methyl ethyl ketone was added to the reaction solution and the mixture was introduced into 0.63 L of heptane being stirred. The resultant polymer precipitate was filtered by suction and dried to give a block copolymer. The acid value was 117 mgKOH/g. The results are shown in Table 1.

Comparative Example 1

An amount of 1165.0 g of BzMA, 116.5 g of MAA, 116.5 g of BTEE, 43.0 g of DBDT, 6.4 g of AIBN, and 1282.0 g of methyl ethyl ketone were charged into a flask equipped with an argon gas introduction pipe and a stirrer blade, followed by allowing the mixture to undergo reaction at 60° C. for 24 hours. The rate of polymerization was 98%, Mw was 7,090, and PDI was 1.49.

Added to the above reaction solution was a mixed solution of 1388.0 g of BMA, 734.0 g of MMA, 596.0 g of MAA, 12.8 g of AIBN, 538.0 g of methyl ethyl ketone, 1677.0 g of acetonitrile, and 503.0 g of methanol, previously placed in an argon-substituted atmosphere, followed by allowing the resultant mixture to undergo reaction at 60° C. for 28 hours. The rate of polymerization was 98%, Mw was 17,600, and PDI was 1.70.

After the end of the reaction, 18.7 kg of methyl ethyl ketone was added to the reaction solution and the mixture was introduced into 107 L of heptane being stirred. The resultant polymer precipitate was filtered by suction and dried to give a block copolymer. The acid value was 119 mgKOH/g. The results are shown in Table 1.

Comparative Example 2

An amount of 700.0 g of MMA, 300.0 g of MAA, 112.5 g of BTEE, 69.3 g of DBDT, 12.3 g of AIBN, and 1000.0 g of methoxypropanol were charged into a flask equipped with an argon gas introduction pipe and a stirrer blade, followed by allowing the mixture to undergo reaction at 60° C. for 24 hours. The rate of polymerization was 100%, Mw was 5,130, and PDI was 1.38.

Added to the above reaction solution was a mixed solution of 1000.0 g of BzMA, 10.0 g of MAA, 12.3 g of AIBN, and 1000.0 g of acetonitrile, previously placed in an argon-substituted atmosphere, followed by allowing the resultant mixture to undergo reaction at 60° C. for 24 hours. The rate of polymerization was 99%, Mw was 7,850, and PDI was 1.41.

Added to the above reaction solution was a mixed solution of 700.0 g of MMA, 290.0 g of MAA, 6.2 g of AIBN, and 1000.0 g of acetonitrile, previously placed in an argon-substituted atmosphere, followed by allowing the resultant mixture to undergo reaction at 60° C. for 24 hours. The rate of polymerization was 100%, Mw was 11,000, and PDI was 1.46.

After the end of the reaction, 14.0 kg of methyl ethyl ketone was added to the reaction solution and the mixture was introduced into 80.0 L of heptane being stirred. The resultant polymer precipitate was filtered by suction and dried to give a block copolymer. The acid value was 132 mgKOH/g. The results are shown in Table 1.

TABLE 1

|  | Monomer Composition (mass ratio) | | | Mass Ratio Among Blocks | | | Mw | PDI | Acid Value [mg/KOH] |
| --- | --- | --- | --- | --- | --- | --- | --- | --- | --- |
|  | A Block | B Block | A Block | A Block | B Block | A Block | | | |
| Ex. 1 | BMA/MMA/MAA (52/27/21) | BzMA/MAA (99/1) | BMA/MMA/MAA (52/27/21) | 35 | 30 | 35 | 12600 | 1.38 | 96 |
| Ex. 2 | BMA/MMA/MAA (51/27/22) | BzMA/MAA (91/9) | BMA/MMA/MAA (51/27/22) | 34 | 32 | 34 | 13800 | 1.34 | 100 |
| Ex. 3 | BMA/MMA/MAA (51/27/22) | BzMA/MAA (91/9) | BMA/MMA/MAA (51/27/22) | 34 | 32 | 34 | 16300 | 1.63 | 115 |
| Ex. 4 | BMA/MMA/MAA (48/26/26) | BzMA/MAA (91/9) | BMA/MMA/MAA (48/26/26) | 34 | 32 | 34 | 15300 | 1.39 | 137 |
| Ex. 5 | BMA/MMA/MAA (54/29/17) | BzMA/MAA (91/9) | BMA/MMA/MAA (54/29/17) | 34 | 32 | 34 | 20000 | 1.42 | 98 |
| Ex. 6 | BMA/MMA/MAA (58/31/12) | BzMA/MAA (91/9) | BMA/MMA/MAA (58/31/12) | 34 | 32 | 34 | 15300 | 1.41 | 78 |
| Ex. 7 | BMA/MMA/MAA (51/27/22) | CHMA/MAA (91/9) | BMA/MMA/MAA (51/27/22) | 34 | 32 | 34 | 13300 | 1.48 | 117 |
| Comp. Ex. 1 | — | BzMA/MAA (91/9) | BMA/MMA/MAA (51/27/22) | — | 32 | 68 | 17600 | 1.70 | 119 |
| Comp. Ex. 2 | MMA/MAA (70/30) | BzMA/MAA (99/1) | MMA/MAA (71/29) | 33 | 34 | 33 | 11000 | 1.46 | 132 |

Production of Pigment Dispersion Composition

Example 8

An amount of potassium hydroxide to neutralize 70% of the acid groups in the block copolymer was dissolved in water and the block copolymer obtained in Example 1 was then added to the potassium hydroxide solution, thus preparing a 20% by mass aqueous solution of dispersant.

An amount of 30 parts by mass of dispersant aqueous solution prepared above, 10 parts by mass of pigment (CI Pigment Blue 15:3, trade name: Heliogen® Blue K7097, manufactured by BASF SE), 36 parts by mass of deionized water, 9.2 parts by mass of glycerin, 2.8 parts by mass of PEG-1540, 9.2 parts by mass of 2-pyrrolidone, 1.8 parts by mass of 1,2-hexanediol, 0.32 parts by mass of ethylene glycol monohexyl ether, 0.32 parts by mass of OLFINE® E1004 (manufactured by Nissin Chemical Industry Co., Ltd.), 0.64 parts by mass of triethanolamine, 0.05 parts by mass of PROXEL GXL(S) (manufactured by Lonza Japan Ltd.), and 400 parts by mass of 0.3-mm zirconia beads were added and mixed for two hours by a bead mill (trade name:

DISPERMAT® CA, manufactured by VMA-GETZMANN GmbH), thus sufficiently dispersing the pigment into the solution. After the end of the dispersion, the beads were filtered out to obtain a pigment dispersion liquid.

An ink-jet ink was prepared to have a composition of 60 parts by mass of the resultant pigment dispersion liquid, 4.4 parts by mass of glycerin, 1.3 parts by mass of PEG-1540, 4.4 parts by mass of 2-pyrrolidone, 0.87 parts by mass of 1,2-hexanediol, 0.15 parts by mass of ethylene glycol monohexyl ether, 0.15 parts by mass of OLFINE® E1004 (manufactured by Nissin Chemical Industry Co., Ltd.), 0.31 parts by mass of triethanolamine, 0.02 parts by mass of PROXEL GXL(S) (manufactured by Lonza Japan Ltd.), and 28 parts by mass of deionized water.

The obtained ink-jet ink was measured in terms of viscosity (initial viscosity and viscosity after seven days), OD value, and OD value retention. The measurement results are shown in Table 2.

Example 9

An ink-jet ink was prepared and measured in the same manner as in Example 8 except that the copolymer was changed to the copolymer obtained in Example 2.

Example 10

An ink-jet ink was prepared and measured in the same manner as in Example 8 except that the copolymer was changed to the copolymer obtained in Example 3.

Example 11

An ink-jet ink was prepared and measured in the same manner as in Example 8 except that the copolymer was changed to the copolymer obtained in Example 4.

Example 12

An ink-jet ink was prepared and measured in the same manner as in Example 8 except that the copolymer was changed to the copolymer obtained in Example 5.

Example 13

An ink-jet ink was prepared and measured in the same manner as in Example 8 except that the copolymer was changed to the copolymer obtained in Example 6.

Example 14

An ink-jet ink was prepared and measured in the same manner as in Example 8 except that the copolymer was changed to the copolymer obtained in Example 7.

Example 15

An ink-jet ink was prepared and measured in the same manner as in Example 8 except that the pigment was changed to CI Pigment Red 122 (trade name: Ink Jet Magenta E02, manufactured by Clariant SE).

Example 16

An ink-jet ink was prepared and measured in the same manner as in Example 8 except that the pigment was changed to CI Pigment Yellow 74 (trade name: HANSA Yellow 5GX01, manufactured by Clariant SE).

Example 17

An ink-jet ink was prepared and measured in the same manner as in Example 8 except that the pigment was changed to CI Pigment Black 7 (trade name: Carbon Black MA-100, manufactured by Mitsubishi Chemical Corporation).

Comparative Example 3

An ink-jet ink was prepared and measured in the same manner as in Example 8 except that the copolymer was changed to the copolymer obtained in Comparative Example 1.

Comparative Example 4

An ink-jet ink was prepared and measured in the same manner as in Example 8 except that the copolymer was changed to the copolymer obtained in Comparative Example 2.

TABLE 2

|  | Pigment | Copolymer | Evaluation of Ink-jet Ink | | | |
|---|---|---|---|---|---|---|
|  |  |  | Initial Viscosity [mPa · s] | Viscosity After 7 Days [mPa · s] | OD Value | OD Value Retention [%] |
| Ex. 8 | Blue 15:3 | Ex. 1 | 4.2 | 4.1 | 0.76 | 96 |
| Ex. 9 | Blue 15:3 | Ex. 2 | 4.3 | 5.9 | 0.74 | 89 |
| Ex. 10 | Blue 15:3 | Ex. 3 | 4.4 | 5.8 | 0.76 | 96 |
| Ex. 11 | Blue 15:3 | Ex. 4 | 5.4 | 4.3 | 0.72 | 94 |
| Ex. 12 | Blue 15:3 | Ex. 5 | 6.9 | 4.1 | 0.73 | 99 |
| Ex. 13 | Blue 15:3 | Ex. 6 | 6.6 | 4.1 | 0.76 | 95 |
| Ex. 14 | Blue 15:3 | Ex. 7 | 7.3 | 4.4 | 0.72 | 90 |
| Ex. 15 | Red 122 | Ex. 1 | 5.7 | 4.5 | 0.60 | 97 |
| Ex. 16 | Yellow 74 | Ex. 1 | 4.3 | 4.3 | 0.60 | 100 |
| Ex. 17 | Black 7 | Ex. 1 | 5.4 | 4.6 | 0.71 | 92 |
| Comp. Ex. 3 | Blue 15:3 | Comp. Ex. 1 | 4.6 | 5.0 | 0.70 | 71 |
| Comp. Ex. 4 | Blue 15:3 | Comp. Ex. 2 | 6.7 | 14.5 | 0.67 | 82 |

In all of Examples above, it was shown that a good print density (OD value) and fixability (OD value retention) were obtained at low viscosity (initial viscosity and viscosity after seven days) during printing on glossy paper. It can be seen from these results that the dispersant according to the present invention is useful for ink-jet ink.

The invention claimed is:

1. An ABA block copolymer comprising:
an A block containing a structural unit represented by a general formula (1) below and a structural unit derived from a vinyl monomer with an acid group; and a B block containing a structural unit derived from a vinyl monomer with an aromatic ring group or an alicyclic alkyl group, the ABA block copolymer having an acid value of 30 to 250 mgKOH/g,

[Chem. 1]

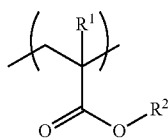
(1)

wherein in the general formula (1) $R^1$ is a hydrogen atom or a methyl group and $R^2$ is an alkyl group having 2 to 10 carbon atoms,
the structural unit represented by the general formula (1) is at a content of 20 to 80% by mass in 100% by mass of the A block
and wherein the content of the structural unit derived from a vinyl monomer with an acid group is, in 100% by mass of the A block, 5 to 40% by mass.

2. The ABA block copolymer according to claim 1, wherein the acid group is at least one selected from the group consisting of a carboxyl group, a sulfonic acid group, and a phosphoric acid group.

3. The ABA block copolymer according to claim 1, wherein a content of the B block is 20 to 80% by mass in 100% by mass of the entire ABA block copolymer.

4. The ABA block copolymer according to claim 1, wherein the ABA block copolymer has a polydispersity index (PDI) of less than 2.0.

5. The ABA block copolymer according to claim 1, wherein the ABA block copolymer is formed by living radical polymerization.

6. A dispersant containing the ABA block copolymer according to claim 1 and/or a neutralized product of the ABA block copolymer.

7. A pigment dispersion composition containing the dispersant according to claim 6, a pigment, and an aqueous dispersion medium.

8. The pigment dispersion composition according to claim 7, wherein the pigment dispersion composition is an ink-jet ink.

* * * * *